United States Patent [19]

Hudson

[11] 3,989,348
[45] Nov. 2, 1976

[54] OPTICAL SCANNER WITH LARGE DEPTH OF FOCUS
[75] Inventors: Kenneth Clifford Hudson, Philadelphia, Pa.; Richard Francis Kenville, Delran, N.J.
[73] Assignee: RCA Corporation, New York, N.Y.
[22] Filed: Apr. 28, 1975
[21] Appl. No.: 572,006

[52] U.S. Cl. ................................. 350/6; 350/7; 350/204; 356/167
[51] Int. Cl.² .................................... G02B 27/17
[58] Field of Search ............ 350/6, 266, 178, 229, 350/285, 205, 204, 234, 37, 183, 7; 250/229, 234, 221, 224; 356/160–167

[56] References Cited
UNITED STATES PATENTS

| | | | |
|---|---|---|---|
| 2,244,687 | 6/1941 | Goldsmith et al. | 350/204 |
| 3,514,182 | 11/1967 | Banks | 350/285 |
| 3,658,419 | 4/1972 | Simonsson | 350/205 |
| 3,720,454 | 3/1973 | Inderheese | 350/204 |
| 3,904,870 | 9/1975 | Stauffer | 250/229 |

Primary Examiner—John K. Corbin
Assistant Examiner—Ben W. delos Reyes
Attorney, Agent, or Firm—Edward J. Norton; Raymond E. Smiley

[57] ABSTRACT

An optical scanner for focusing an optical beam on a surface, which may be at any of a range of distances, utilizes a plurality of optical plates. The plates, which are of different thicknesses, are selectively insertable in the optical beam path to focus the beam at the surface according to the particular distance thereof.

5 Claims, 5 Drawing Figures

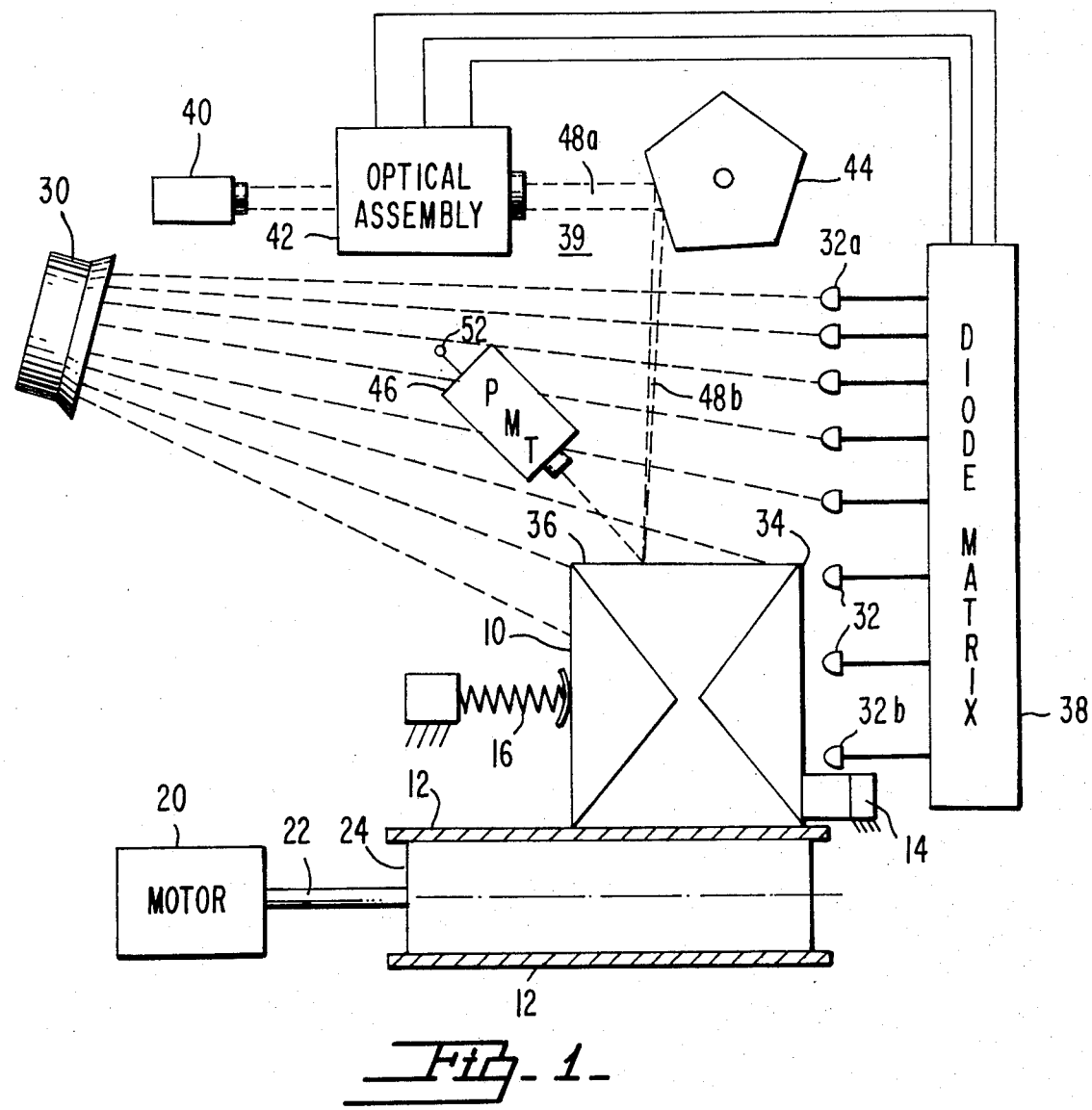
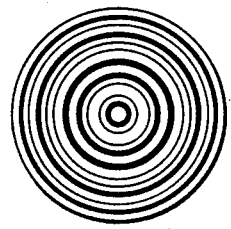
Fig. 2a.
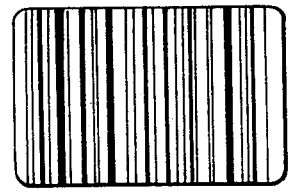
Fig. 2b.

OPTICAL SCANNER WITH LARGE DEPTH OF FOCUS

BACKGROUND OF THE INVENTION

There are various applications where it is necessary to selectively focus an optical beam on a surface which may be at any of a wide range of distances from a reference point in the optical system. Conventionally, this is done through the intermediacy of a series of positionable lenses as, for example, in a slide or movie projector. Such an optical system requires accurately made lenses and requires a rather complex mechanical linkage system for moving the lenses relative to one another, which must be capable of holding the lenses once positioned. Additionally, problems exist in providing a proper mechanical linkage if the focus of the system must be rapidly and/or frequently changed. Such requirements are present when an optical beam is to be focused at the surface of a series of articles of different sizes rapidly passing through a reading station where each article is optically scanned.

SUMMARY OF THE INVENTION

An optical system, for selectively focusing an optical beam on an object surface located in the beam path at any of a plurality of distances from a reference point, includes an area in which the beam's rays are non-parallel. Means are included for measuring the distance of the surface from the reference point. A plate of optically transparent material having opposed parallel surfaces, the spacing between which is a function of the measured distance, is positioned in the optical path in the area in which the beam's rays are non-parallel. The parallel surfaces of the plate are generally normal to the axis of the optical beam so that the beam is altered according to the spacing between the parallel surfaces to be focused at the object surface.

BRIEF DESCRIPTION OF THE DRAWING

FIG. 1 is an overall system diagram of an optical scanning system employing a novel focusing optics according to the present invention;

FIGS. 2a and 2b are examples of article labels which may be scanned by the system of FIG. 1;

DETAILED DESCRIPTION

Figure 3:
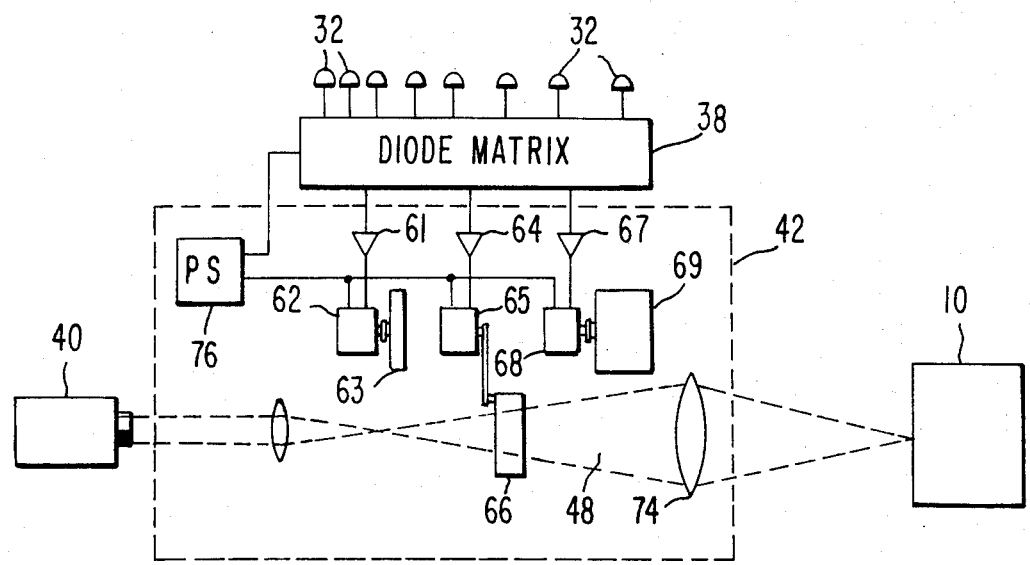
FIG. 3 is a preferred embodiment of an optical system useful in practicing the invention.

Referring to FIG. 1, an article such as a package or container 10 resides on a conveyer belt 12 (illustrated in cross section). The package is laterally positioned against a reference stop 14 by a bias means 16. Alternately, the biasing may be accomplished by merely tilting the conveyer so that gravity urges the package 10 toward stop 14. A drive means such as motor 20 is coupled via shaft 22 to a drive roller 24 for purposes of moving conveyer 12 and thus article 10 along the length dimension of the conveyer. The package 10 is driven past a height sensing station comprising a conventional light source 30 and a series of spaced-apart photo-detectors 32 for measuring the height of the surface 36 above some reference point such as the conveyer 12, there being eight such photo-detectors 32 illustrated in FIG. 1.

The position of detectors 32 relative to that of the stop 14 is such that the article, the height of which is to be determined, passes proximate the photo-detectors 32. Preferably, the light source 30 by the use of a suitable arrangement of lenses is adapted to provide a light beam so that the edge 34 of article 10 casts a reasonably sharp shadow on photo-detectors 32. Further, the light source 30 is positioned at a slight angle to the normal of the plane in which the photo-detectors 32 lie, so that wrapping strings, ribbons, and the like, on article 10 will not cause an incorrect reading. Electronic signals produced at various ones of photodetectors 32, in accordance with light or the absence thereof received thereat, are applied to a diode matrix 38 which produces binary signals indicative of the height of package 10.

An optical scanning system 39 is located beyond the height sensing station along the converger 12 in the direction the package 10 is moving. The optical scanning system 39 comprises a source of coherent, colimated light, such as a laser 40, an optical assembly 42 to which signals from matrix 38 are coupled, a rotating multi-sided scanning mirror 44 and a light sensing transducer such as a photomultiplier tube 46. Scanning mirror 44 is positioned to receive a beam of light 48a from optical assembly 42 and to scan a reflected light beam 48b along the upper surface 36 of the article 10. The scanning beam 48b will scan across any printing on the surface 36 and will also scan across coded labels such as either of the types shown in FIGS. 2a or 2b. The coded label may be of the type using a plurality of concentric circles having two optically different characteristics as shown in FIG. 2a. The coded label may comprise parallel bars of two optically different characteristics as shown in FIG. 2b. In either case, the label may be coded to provide, for example, a part number, a price, or a postal zip code. Such labels may be placed on the article 10 by equipment described in U.S. patent application Ser. No. 552,165, filed Feb. 24, 1975, by B. W. Siryj, and assigned to the same Assignee as the instant application. Light reflected from the surface 36 is received by photomultiplier tube 46 and converted to electrical signals at terminal 52. Terminal 52 may be attached to decoding equipment of the type described in U.S. Pat. No. 3,708,655, issued Jan. 2, 1973, to J. Schanne, and assigned to the instant Assignee.

Reference is now made to FIG. 3 for a detailed discussion of the optical assembly 42 shown in FIG. 1. The three output leads from diode matrix 38 are coupled to input terminals of power amplifiers 61, 64, 67, respectively. The output leads from the three amplifiers are coupled, respectively, to the coils of rotary solenoids 62, 65, 68, respectively. The solenoids are mechanically coupled, respectively, to three optically transparent plates 63, 66, 69. Each of the plates have opposite plane parallel surfaces, and may be made of such materials as glass or quartz. When a solenoid 65, for example, is energized, it will move its associated plate such as 66 into the optical path 48. Plates such as 63 and 69, attached to unenergized solenoids 62 and 68, will remain out of the optical path. Desirably, if the thickness of plate 63 measured along the optical path 48 is $t$, then the thickness of plate 66 is $2t$, and the thickness of plate 69 is $4t$. That is, the thickness of the plates is related in a binary progression. Such an arrangement allows a maximum focal range with a minimum number of plates.

A beam expander comprising a pair of convex lenses 72 and 74 is located in the optical path 48 with one lens 72 preceding and the other lens 74 following the arrangement of plates. A power source 76, having suitable characteristics to power solenoids 62, 65 and 68, is coupled between common leads of all solenoids and diode matrix 38.

Figure 4:
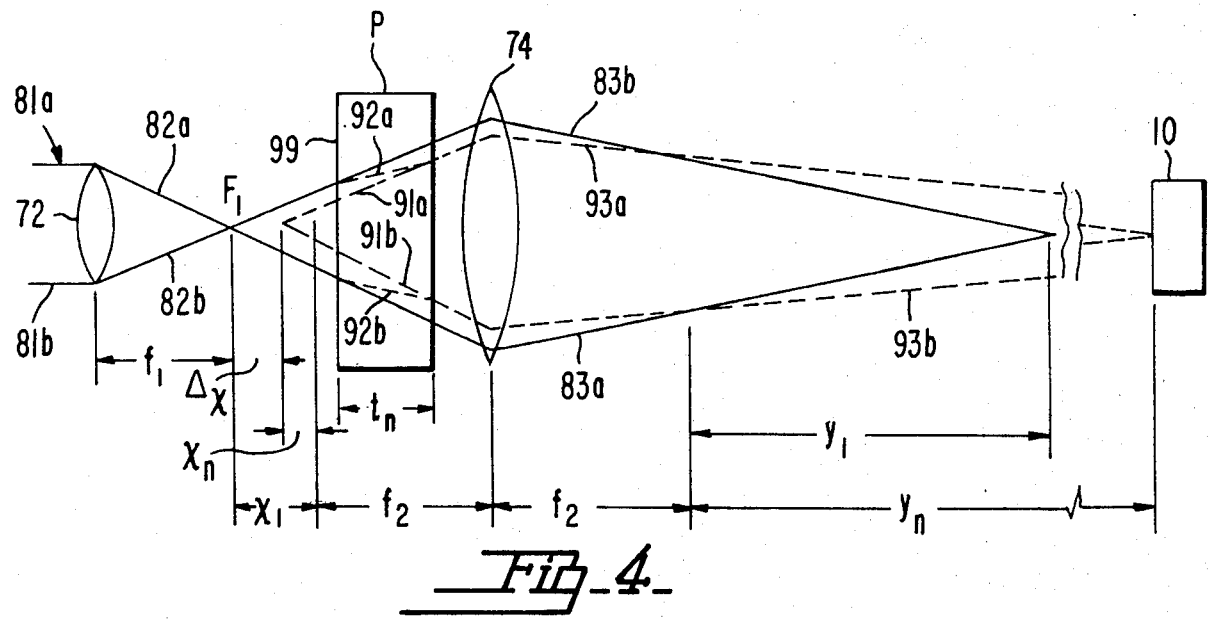
FIG. 4 is an optical ray trace diagram of the optical system of FIG. 3.

A ray trace diagram of the optic apparatus of FIG. 3 is illustrated in FIG. 4 to which reference is now made. In the absence of any plates (such as that legended P in FIG. 4) in the optical path, the solid lines 81a, 81b, 82a, 82b, 83a, and 83b, comprise the correct ray traces. Thus, 81a, 81b, represent traces from laser 40, FIG. 3. These rays are incident on a converging lens 72, positioned with its optical axis parallel to traces 81a, 81b, which focuses them at a distance $f_1$ to the right of lens 72 (as illustrated in FIG. 4) at its focal point legended $F_1$. A real object located at $F_1$, a distance $x_1 + f_2$ to the left of converging lens 74 will focus at a point $f_2 + y_1$ to the right of lens 74 where:

$$y_1 = f_2^2/x_1 \qquad 1.$$

It is noted that the scanning mirror 44, shown in FIG. 1, is not shown in FIGS. 3 or 4 for simplicity, but it would be preferably located at the focal distance $f_2$ to the right of lens 74 where it may be mathematically or graphically proven that the beam diameter remains constant for any plate combination.

When a plate combination P is inserted in the optical path having a thickness $t_n$ (where $t_n$ is the sum of the thicknesses of the combination of plates 63, 66 and 69 inserted in the path and shown as one plate for simplicity), the ray traces are as indicated by solid lines 81a, 81b, 82a, 82b and by dashed lines 91a, 91b, 92a, 92b, 93a, 93b. That is, with plate combination P inserted as shown, a virtual object is located at $f_2 + x_n$ to the left of lens 74.

Where $x_n = x_1 - \Delta x$ 2.

$\Delta x = N-1/N \cdot t_n$ 3.

$\Delta x = 0.33\ t_n$ (4)

$N$ = refractive index of the plate = 1.5 for glass

To generalize equation (1):

$$y_n = f_2^2/x_n \qquad 5.$$

(It should be noted that the ray traces 82b and 92a and the ray traces 82a and 92b will be at angles with surface 99 of plate P in accordance with Snell's law). Substituting equations (2) and (3) in (5):

$$y_n = \frac{f_2^2}{x_1 - K \cdot t_n}, \text{ where } K = \frac{N-1}{N} \qquad (6)$$

Since $f_2$, $x_1$, and $K$ are all constants in a given system, $y_n$, the value of which when added to $f_2$ represents the focal position of a beam to the right of lens 74, is an inverse function of $t_n$, the thickness of the plate combination P.

Further, this characteristic of the optical system is not dependent on where the plate combination P is located so long as the rays of the beam impinging thereon are non-parallel. Thus, the plate combination P could be located either between lenses 72 and 74 as illustrated or to the right of lens 74. It should be noted that with the plate combination P placed as illustrated, relatively narrow plates (that is, plates having a relatively small thickness $t_n$) provide relatively large changes in focal distance. A plate combination P located to the right of lens 74 will provide a relatively small change in focal distance for a relatively large change in $t_n$. Therefore, it is possible to have a vernier effect by having plates located on either side of lens 74. Optical assembly 42 and scanner 44 (FIG. 1) are located such that without any plate combination P in the optical path focus will occur on the surface 36 of the tallest article 10 expected; that is, an article which just blocks photo-detector 32a. The total thickness of plates 63, 66, 69 are such that when all are in the optical path focus will occur on an article 10 having a surface 36 below photo-detector 32b.

In operation, as an article 10, bearing a label of the type shown in FIGS. 2a or 2b, is driven past photo-detectors 32, an indication of the height of the article is represented in electrical binary signals at the output of diode matrix 38. As a result, none, certain ones, or all of plates 63, 66, 69 are moved into the optical path by their respective solenoids 62, 65, 68. For example, in FIG. 3, plate 66 has been placed in the optical path. Then, as scanner 44 rotates, the focused beam is swept across surface 36 and the resultant electronic signals received by photo-multiplier tube 46 are converted to electric signals to be processed as desired. It should be clear that the number of photo-detectors 32 and the number and size of parallel plates utilized will depend on the range and size of articles to be scanned and the resolution desired. In a working embodiment, five quartz plates were used to provide 32 focal zones covering approximately 50 centimeters of parcel height variation. The focused spot size was less than 0.25 mm within each of the focal zones. The thinnest plate was nominally 0.648 mm thick while the thickest plate was nominally 10.36 mm thick (i.e. 16 times the thickness of the thinnest plate).

What is claimed is:
1. An optical system for focusing an illuminating beam on an object surface which can be at any of a range of distances from a reference surface comprising in combination:
    means producing an illuminating beam directed generally toward said object surface;
    means providing a signal having a parameter indicative of the distance of said object surface from said reference surface;
    optically transparent means comprising a plurality of optical plates having opposed parallel surfaces, each positionable in the path of said beam; and
    means responsive to said signal for selectively positioning none, one or more than one plate in said path of said beam for focusing said beam on said object surface.
2. The combination as set forth in claim 1, wherein there are N plates numbered, 1, 2, 3, . . . N respectively, the thickness of each being proportional to $2^{i-1}$, where $i$ is the number of the plate.
3. The combination as set forth in claim 1 wherein said optical system includes beam expander optics, and wherein said transparent means is located within said beam expander optics.

4. The combination as set forth in claim 1 wherein said illuminating beam is generated by a collimated light source.

5. An optical scanning system for focusing and scanning a light beam along the surface of an article bearing optically readable indicia for reading said indicia wherein said surface may be at any one of a plurality of distances from said optical system comprising, in combination:

means producing a signal indicative of the distance between said surface and said optical system;

beam expanding optics forming a part of the optical path of said optical system;

optically transparent means comprising a plurality of transparent plates of various thicknesses, each having plane parallel surfaces and including means for positioning none, one or more of said plates in parallel in said part of said optical path in accordance with the value of said signal indicating the distance of said object surface from said optical system, the total thickness of all plates so positioned in said optical path being determined according to said distance; and means receptive of light reflected from said indicia for producing signals corresponding to said indicia.

* * * * *

UNITED STATES PATENT OFFICE
CERTIFICATE OF CORRECTION

PATENT NO. : 3,989,348

DATED : November 2, 1976

INVENTOR(S) : Kenneth Clifford Hudson, Richard Francis Kenville

It is certified that error appears in the above-identified patent and that said Letters Patent are hereby corrected as shown below:

Immediately following the title, the following statement should be included --The invention herein described was made in the course of or under a contract with the United States Postal Service.--

Signed and Sealed this

Twenty-second Day of March 1977

[SEAL]

Attest:

RUTH C. MASON
*Attesting Officer*

C. MARSHALL DANN
*Commissioner of Patents and Trademarks*